(12) United States Patent
Shigematsu et al.

(10) Patent No.: US 8,164,811 B2
(45) Date of Patent: Apr. 24, 2012

(54) OPTICAL SCANNING ACTUATOR

(75) Inventors: Ryohei Shigematsu, Yokohama (JP);
Hiroshi Imamura, Yokohama (JP);
Takafumi Hirata, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 232 days.

(21) Appl. No.: 12/451,668

(22) PCT Filed: May 30, 2008

(86) PCT No.: PCT/JP2008/059999
§ 371 (c)(1),
(2), (4) Date: Nov. 24, 2009

(87) PCT Pub. No.: WO2008/149796
PCT Pub. Date: Dec. 11, 2008

(65) Prior Publication Data
US 2010/0165433 A1 Jul. 1, 2010

(30) Foreign Application Priority Data
May 31, 2007 (JP) .................. 2007-144920

(51) Int. Cl.
*G02B 26/08* (2006.01)
(52) U.S. Cl. .................................. 359/200.7
(58) Field of Classification Search ........... 359/200.7, 359/212.1–214.1, 223.1–226.1, 199.3; 310/40 R, 310/46
See application file for complete search history.

(56) References Cited

U.S. PATENT DOCUMENTS
6,879,420 B2 * 4/2005 Tominaga et al. ......... 359/224.1
2003/0035188 A1 2/2003 Tominaga et al.

FOREIGN PATENT DOCUMENTS
| JP | 4-355652 | 12/1992 |
| JP | 6-165466 | 6/1994 |
| JP | 6-233515 | 8/1994 |
| WO | WO-02/008818 A1 | 1/2002 |

OTHER PUBLICATIONS

International Search Report and Written Opinion dated Jul. 15, 2008 issued in PCT/JP2008/059999.

* cited by examiner

*Primary Examiner* — Euncha Cherry
(74) *Attorney, Agent, or Firm* — Edwards Wildman Palmer LLP

(57) ABSTRACT

For realizing widening of a light scanning angle and excellent durability, the optical scanning actuator includes a movable unit that supports an optical element, a plurality of leaf springs having a thin plate shape with one end portion being fixed and another end portion being attached to the movable unit, and an electromagnetic driving unit including a magnet, a yoke laminated on the magnet to form a closed magnetic circuit together with the magnet, and a coil held by the movable unit. The coil is positioned in a gap between the magnet and the yoke such that opening plane of the coil is substantially orthogonal to a laminating direction of the magnet and the yoke. The movable unit is driven by an electromagnetic force applied to the coil.

6 Claims, 6 Drawing Sheets

OPTICAL SCANNING ACTUATOR

TECHNICAL FIELD

The present invention relates to an optical scanning actuator that performs scanning with emitted light.

BACKGROUND ART

Conventionally, as an apparatus that utilizes a scanning device of a laser light or the like, there is known a scanning laser radar apparatus, a laser scanner, a laser printer, a laser marker, an object monitoring apparatus, and the like. As an optical scanning actuator that is used in the scanning laser radar apparatus for preventing collision of a vehicle among these apparatuses, a technology is known in which one movable mirror is caused to swing or perform a rotation movement by a motor, light from a laser light source is emitted toward the movable mirror, and reflection light thereof is caused to scan as a probing light (for example, see Patent Document 1).

FIG. 6 is a perspective view illustrating a configuration of a conventional optical scanning actuator. In an optical scanning actuator 31 shown in FIG. 6, base end portions of a pair of leaf springs 34a and 34b that are arranged in parallel in an up and down direction are fixed to a fixing member 33 assembled to a base member 32 (the leaf spring 34b is not shown). Each tip portion of the leaf springs 34a and 34b is fixed to a mirror holder 35 that holds a mirror 36 (shown by a chain double-dashed line in FIG. 6) that reflects light incident from a predetermined light source. At the mirror holder 35 as a movable unit, a pair of coils 37a and 37b are arranged at positions at which they are symmetrical around an origin position of the leaf springs 34a and 34b as a center.

An arc-shaped yoke 38 is fastened to the base member 32. An arc-shaped portion of the yoke 38 consists of a lower side portion 38a and an upper side portion 38b that are parallel to each other, and the lower side portion 38a passes through each opening plane of the coils 37a and 37b. A magnet 39 is fixed to a surface of the upper side portion 38b opposing the lower side portion 38a out of the surfaces of the upper side portion 38b.

In the optical scanning actuator 31 having the above configuration, the yoke 38 and the magnet 39 form a closed magnetic flux. Therefore, when an alternating current flows in the coils 37a and 37b, the Lorentz force acts on the coils 37a and 37b. The mirror holder 35 that holds the coils 37a and 37b is driven by the Lorentz force, along with which the mirror 36 swings, whereby light scanning is realized.

Patent Document 1: International Publication Pamphlet No. WO 02/008818

DISCLOSURE OF INVENTION

Problem to be Solved by the Invention

However, in the above conventional technology, the influence of the deflection of the leaf springs 34a and 34b becomes remarkable as a swing angle of the mirror 36 from the origin position becomes large, the movable unit slightly retracts in a direction of the fixing member 33, and the internal surfaces of the coils 37a and 37b come in contact with the yoke 38 in some cases. Therefore, a scanning error occurs in a wide angle area in which the swing angle from the origin position is large, which is an obstacle to realize widening of the scanning angle. Moreover, when the internal surfaces of the coils 37a and 37b come in contact with the yoke 38 in the wide angle area, these members may be damaged, leading to a problem in durability of the apparatus.

The present invention has been achieved in view of the above, and it is an object of the present invention to provide an optical scanning actuator that is capable of realizing widening of a light scanning angle and is excellent in durability.

Means for Solving Problem

To overcome the problems and achieve the object mentioned above, according to the present invention, an optical scanning actuator that performs scanning with light emitted from an optical element comprises:

a movable unit that supports the optical element and is movable together with the optical element;

a plurality of leaf springs which has a thin plate shape and of which one end portion in a longitudinal direction is fixed and another end portion in the longitudinal direction is attached to the movable unit; and an electromagnetic driving unit that includes a magnet that generates a magnetic flux, a yoke that is laminated in part on the magnet and forms a closed magnetic circuit together with the magnet, and a coil which is held by the movable unit, which is positioned in a clearance between the magnet and the yoke, and of which opening surface is approximately orthogonal to a laminating direction of the magnet and the yoke, and that drives the movable unit by an electromagnetic force applied to the coil.

Further, in the optical scanning actuator according to the present invention, the coil has a flat shape in which a height in a direction orthogonal to the opening surface is smaller than an arbitrary width in a direction parallel to the opening surface.

Furthermore, in the optical scanning actuator according to the present invention, the yoke includes two arc-shaped portions having surfaces which are disposed in parallel so as to oppose to each other and have a same semi-circular ring shape with each other, and the optical element is movable in the neighborhood of an outer edge of the arc-shaped portions along the outer edge.

Still further, in the optical scanning actuator according to the present invention, the magnet includes a surface that has a semi-circular ring shape substantially identical to the surfaces of the arc-shaped portions included in the yoke, and is laminated and fixed to a surface of one arc-shaped portion out of the two arc-shaped portions, the surface opposing another arc-shaped portion.

Still further, in the optical scanning actuator according to the present invention, the leaf springs are arranged in parallel, and surfaces thereof that correspond to each other pass through a same plane and longitudinal directions thereof are substantially in parallel with each other in a state where each of the leaf springs is not deflected, and the magnet, the yoke, and the coil are positioned between any adjacent two leaf springs out of the leaf springs.

Still further, in the optical scanning actuator according to the present invention, the optical element is a mirror, and a surface of the mirror is orthogonal to the longitudinal direction of the leaf springs in a state where the leaf springs are not deflected.

Effect of the Invention

According to the present invention, the coil, which forms part of the electromagnetic driving unit that drives the movable unit capable of moving together with the optical element, is positioned in the gap between the magnet and the yoke, which also forms part of the electromagnetic driving unit, and the opening plane thereof is substantially orthogonal to the laminating direction of the magnet and the yoke, so that the coil does not come into contact with the yoke even when the movable unit is moved in a wide range, enabling to accurately perform scanning with light. Thus, an optical scanning actuator that is capable of realizing widening of the light scanning angle and is excellent in durability can be provided.

Figure 1:
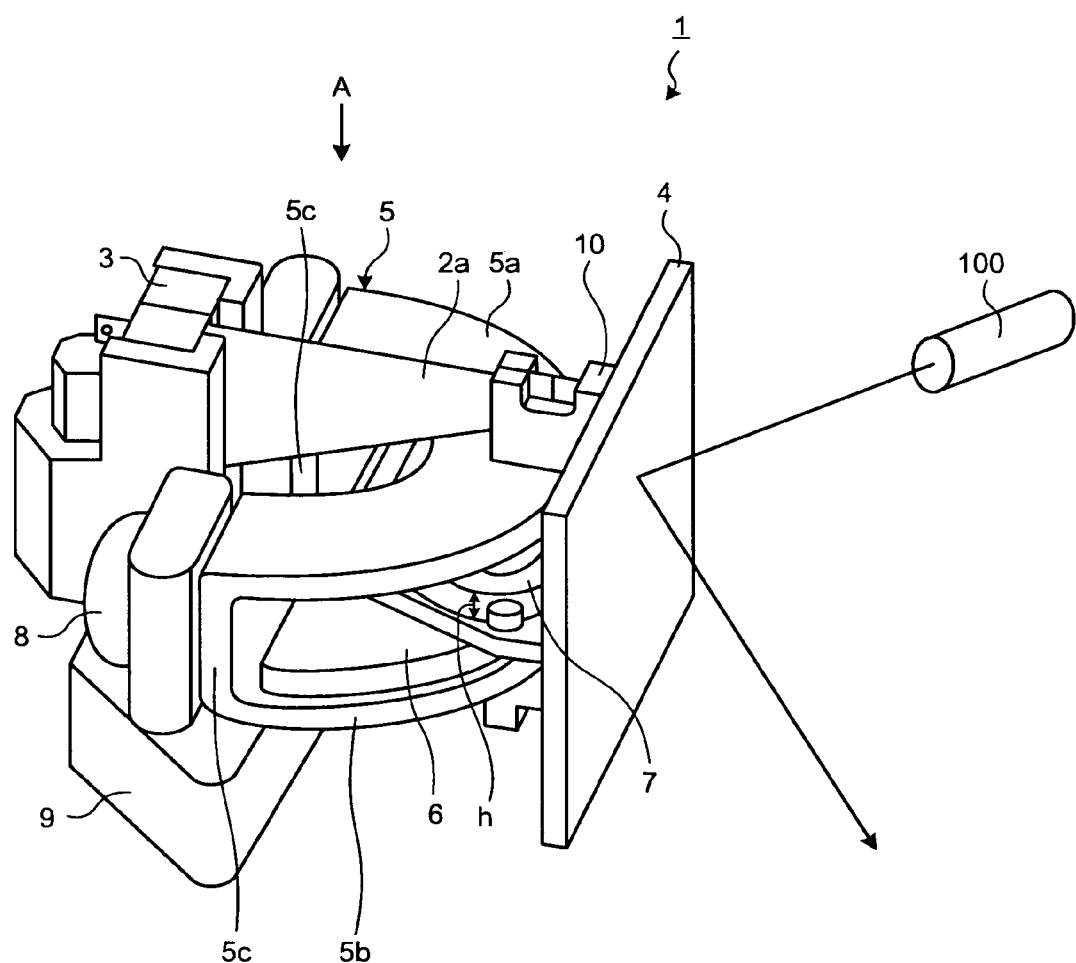
FIG. 1 is a perspective view illustrating a configuration of an optical scanning actuator according to an embodiment of the present invention.

EXPLANATIONS OF LETTERS OR NUMERALS 1, 11, 31 optical scanning actuator
2a, 2b, 34a, 34b leaf spring
3, 33 fixing member
4, 36 mirror
5, 12, 38 yoke
5a, 5b, 12a, 12b arc-shaped portion
5c coupling portion
6, 39 magnet
7, 37a, 37b coil
8 screw member
9, 32 base member
10 frame member
10a leaf spring attaching portion
10b mirror supporting portion
10c coil placing portion
21a, 21b electrode terminal portion
22a, 22b notched portion
35 mirror holder
38a lower side portion
38b upper side portion
100 light emitting element
200 control circuit
300 position detecting unit

BEST MODE(S) FOR CARRYING OUT THE INVENTION

Figure 2:
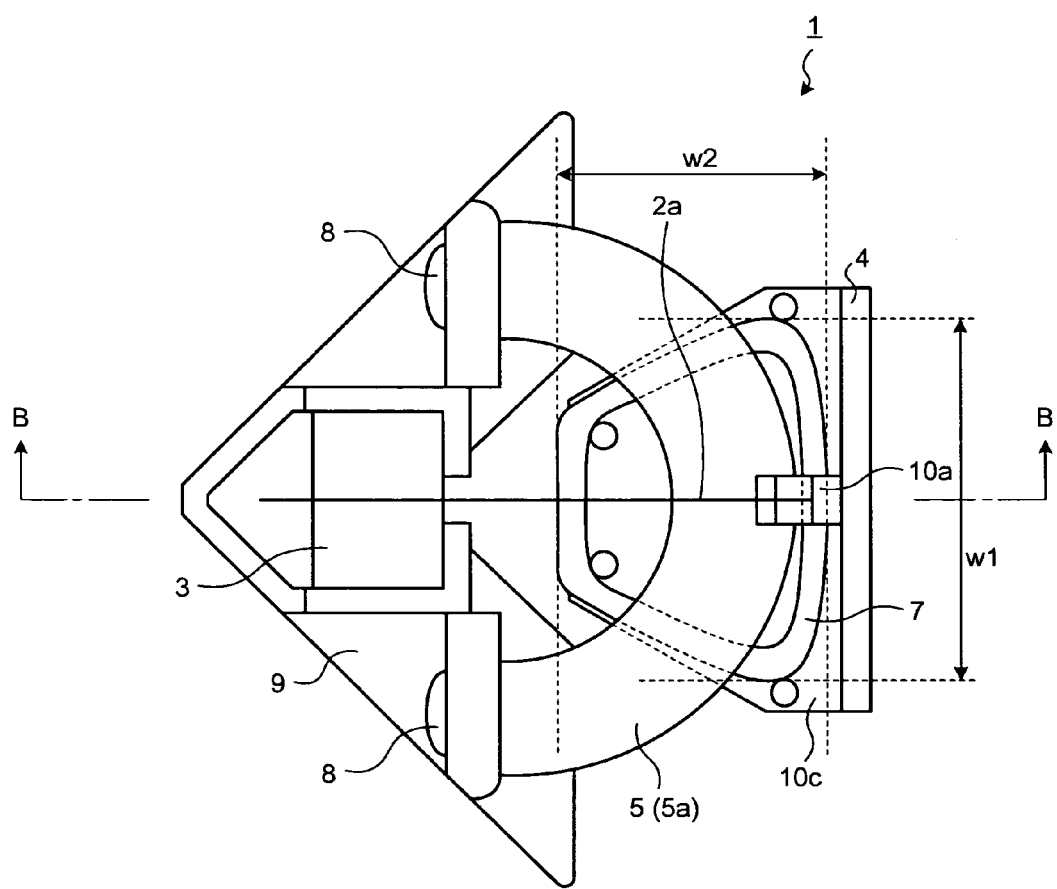
FIG. 2 is a plan view as seen from an arrow A direction in FIG. 1.

Preferred embodiments (hereinafter, "embodiments") for performing the present invention will be explained below with reference to the accompanying drawings. FIG. 1 is a perspective view illustrating a configuration of an optical scanning actuator according to an embodiment of the present invention. FIG. 2 is a plan view as seen from an arrow A direction in FIG. 1. Furthermore, FIG. 3 is a partial cross-sectional view taken along line B-B in FIG. 2.

Figure 3:
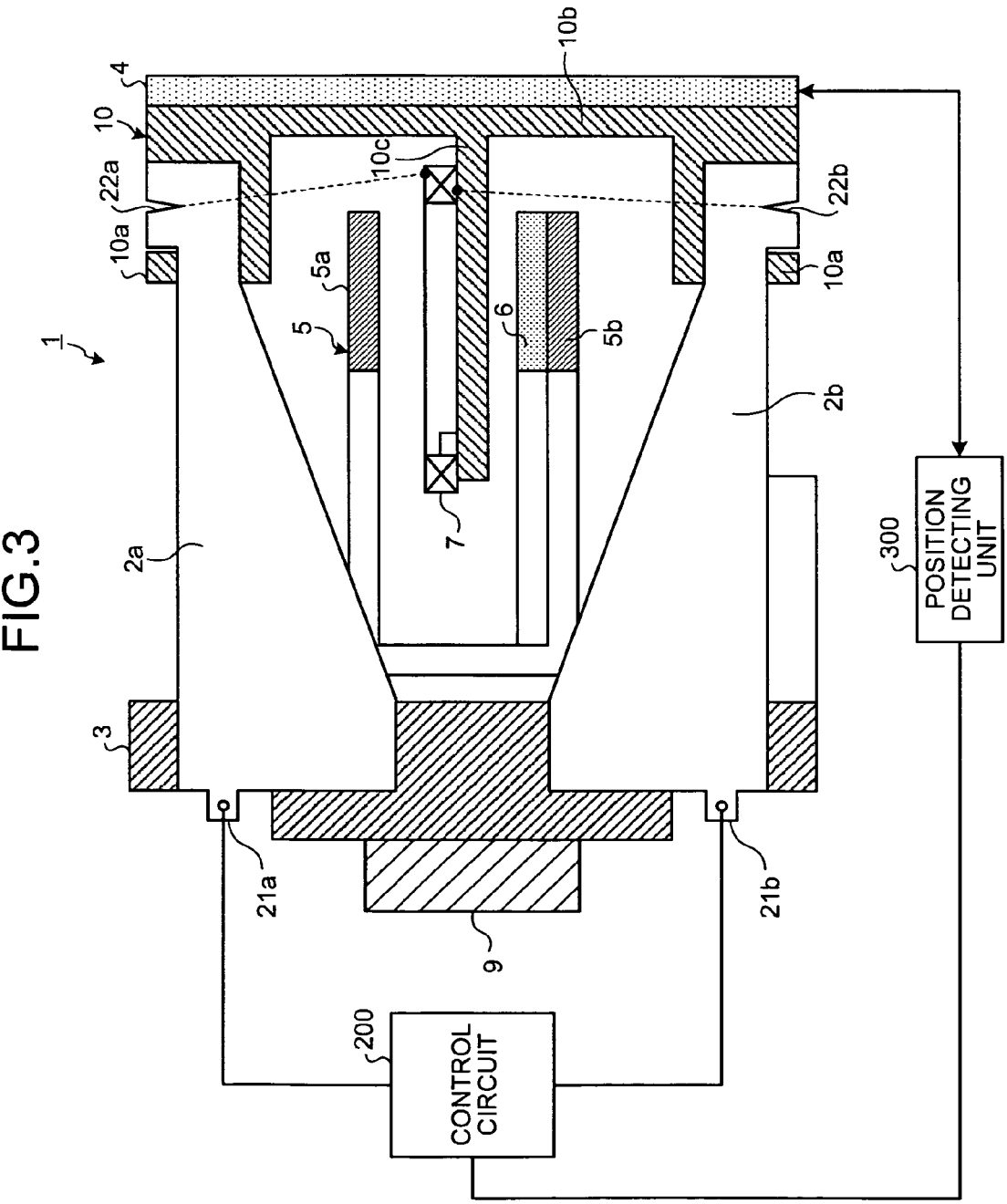
FIG. 3 is a partial cross-sectional view taken along line B-B in FIG. 2.

An optical scanning actuator 1 shown in FIG. 1 to FIG. 3 includes two leaf springs 2a and 2b, a fixing member 3 that fixes each base end portion of the leaf springs 2a and 2b, a mirror 4 as an optical element that reflects incident light emitted by a light emitting element 100 such as a laser diode and emits the reflected light, a yoke 5 and a magnet 6 that form a closed magnetic circuit, a coil 7 that is arranged in a gap between the yoke 5 and the magnet 6, a base member 9 which holds the fixing member 3 and to which the yoke 5 is fixed via screw members 8, and a frame member 10 that constitutes a movable unit capable of moving together with the mirror 4.

The leaf springs 2a and 2b have the same shape and are arranged in parallel, and the surfaces thereof that correspond to each other pass through the same plane and longitudinal directions thereof are in parallel in a state where each of the leaf springs 2a and 2b is not deflected (initial state). Each of the leaf springs 2a and 2b becomes gradually narrow in width toward the tip portion from the base end portion fixed by the fixing member 3. Therefore, a stress distribution of the leaf springs 2a and 2b that function as cantilevers can be made approximately even, and a space in which the yoke 5, the magnet 6, and the coil 7 are arranged can be efficiently ensured. Because the leaf springs 2a and 2b are arranged such that the yoke 5, the magnet 6, and the coil 7 are disposed between the leaf springs 2a and 2b along an upward or downward direction in FIG. 3, the stiffness in a direction in which the mirror 4 swings is high, so that they are less susceptible to disturbances.

An electrode terminal portion 21a is provided at the base end portion of the leaf spring 2a, which projects from the base end portion along the longitudinal direction of the leaf spring 2a in the initial state and to which a wire that connects to a control circuit 200 that generates current flowing in the coil 7 is attached. A notched portion 22a is provided at the tip portion of the leaf spring 2a, which is notched in a direction approximately orthogonal to the longitudinal direction of the leaf spring 2a in the initial state and to which one end of the coil 7 is hooked to ensure energization with the coil 7. The leaf spring 2b includes an electrode terminal portion 21b and a notched portion 22b in the similar manner to the leaf spring 2a.

The leaf springs 2a and 2b having the above configuration are connected to the control circuit 200 via the wires that are connected to the electrode terminal portions 21a and 21b, respectively, and are connected to one end of the coil 7 via the notched portions 22a and 22b. Therefore, the control circuit 200 and the coil 7 are electrically connected, so that current can flow in the coil 7. In FIG. 3, the connection of a winding end portion of the coil 7 and the notched portions 22a and 22b is shown by dotted lines.

The leaf springs 2a and 2b are made of a thin leaf spring material such as beryllium copper, phosphor bronze, and stainless steel, and are formed by a blanking shaping by press work or by an etching shaping. It is possible to apply a polymer sheet or the like having viscoelasticity on the surfaces of the leaf springs 2a and 2b. Whereby, an appropriate damping effect can be applied to the frame member 10, so that breakage of the apparatus itself at resonance or induction of unnecessary vibration due to input of disturbances can be suppressed and it is not needed to generate a large braking force to the coil 7 at a returning position of a swinging movement. Therefore, power saving of the optical scanning actuator 1 can be achieved and a good responsiveness can be realized.

The fixing member 3 is formed by injection molding of engineering plastic such as liquid crystal polymer (LCP) filled with a light-weight and high stiffness glass fiber or the like or polyphenylene sulfide (PPS).

The mirror 4 is realized by using a synthetic resin or light metal such as aluminum, and is supported by the frame member 10 so that the surface (mirror surface) thereof is orthogonal to the longitudinal direction of the leaf springs 2a and 2b in the initial state. A reflection layer that is formed smoothly by aluminum deposition is provided on the surface of the mirror 4. On the surface of the reflection layer, a protection layer, which is formed by a thin film of such as silicon dioxide ($SiO_2$) for protecting the surface from corrosion, oxidation, and the like, is provided.

The yoke 5 includes two arc-shaped portions 5a and 5b having surfaces which are disposed apart in parallel so as to oppose to each other and have the same semi-circular ring shape with each other. The yoke 5 further includes two coupling portions 5c that couple opposing end portions of the arc-shaped portions 5a and 5b, and has a closed shape as a whole. The coupling portions 5c are fixed to the base member 9 via the screw members 8. The yoke 5 having such a configuration is made of a soft magnetic material such as pure iron and forms a closed magnetic circuit together with the magnet 6.

The magnet 6 has a thin-plate shape including a surface approximately identical to the arc-shaped portions 5a and 5b of the yoke 5, and is fixed to the yoke 5 in a state of being laminated on the surface of the arc-shaped portion 5b positioned on the lower side that opposes the arc-shaped portion 5a.

The coil 7 is held by the frame member 10 and is positioned in the gap between the arc-shaped portion 5a of the yoke 5 and the magnet 6. More specifically, the coil 7 is arranged at a position at which the opening plane thereof is orthogonal to a laminating direction of the yoke 5 and the magnet 6, i.e., at a position that crosses the magnetic flux formed by the yoke 5 and the magnet 6 at a right angle.

The opening plane of the coil 7 has an approximately isosceles trapezoid shape, of which short side is positioned at the inner peripheral side of the arc-shaped portions 5a and 5b and long side is positioned at the outer peripheral side of the arc-shaped portions 5a and 5b. The coil 7 including the opening plane having such a shape is arranged in the above manner, so that the movement of the frame member 10 at the inner peripheral side with a small diameter can be made smooth. Moreover, a cross section area of the outer peripheral side with a large diameter can be made large, so that a large amount of the magnetic flux can cross the coil 7, enabling to generate a driving force necessary for the movement of the frame member 10.

The coil 7 has a flat shape in which at least a height (h in FIG. 1) in a direction orthogonal to the opening plane is smaller than an arbitrary width (for example, w1 and w2 in FIG. 2) in a direction parallel to the opening plane. Because the coil 7 has such a flat shape, the gap between the yoke 5 and the magnet 6 can be made small, enabling to have a configuration appropriate for space saving and size reduction.

The yoke 5, the magnet 6, and the coil 7 constitute an electromagnetic driving unit that drives the frame member 10 constituting the movable unit by electromagnetic force and performs scanning with light emitted by the mirror 4.

The frame member 10 includes leaf spring attaching portions 10a to which the tip portions of the leaf springs 2a and 2b are attached, a mirror supporting portion 10b that supports the mirror 4, and a coil placing portion 10c at which the coil 7 is placed. As shown in FIG. 3, an extending direction (upward or downward direction in FIG. 3) of the mirror supporting portion 10b is orthogonal to an extending direction (horizontal direction in FIG. 3) of the coil placing portion 10c. The frame member 10 is realized by using engineering plastic or the like in the similar manner to the fixing member 3.

When the leaf springs 2a and 2b are attached to the fixing member 3 and the frame member 10, the leaf springs 2a and 2b can be formed integrally with the fixing member 3 and/or the frame member 10 as inserting members.

In the optical scanning actuator 1 having the above configuration, the control circuit 200 causes current to flow in the coil 7, thereby changing the magnetic flux penetrating the opening plane of the coil 7. Consequently, the Lorentz force is generated in the coil 7 in a direction that prevents the magnetic flux from changing. The Lorentz force acts as a driving force of the coil 7 and causes the mirror 4 and the frame member 10 to swing. The current that flows in the coil 7 is an alternating current whose frequency is, for example, about 10 to 100 Hz.

The control circuit 200 controls the current that flows in the coil based on position information detected by a position detecting unit 300. The position detecting unit 300 includes a magnetic sensor such as a hall IC, detects a position at a predetermined point of the leaf springs 2a and 2b, the mirror 4, or the frame member 10, and outputs the detected position information to the control circuit 200.

Figure 4:
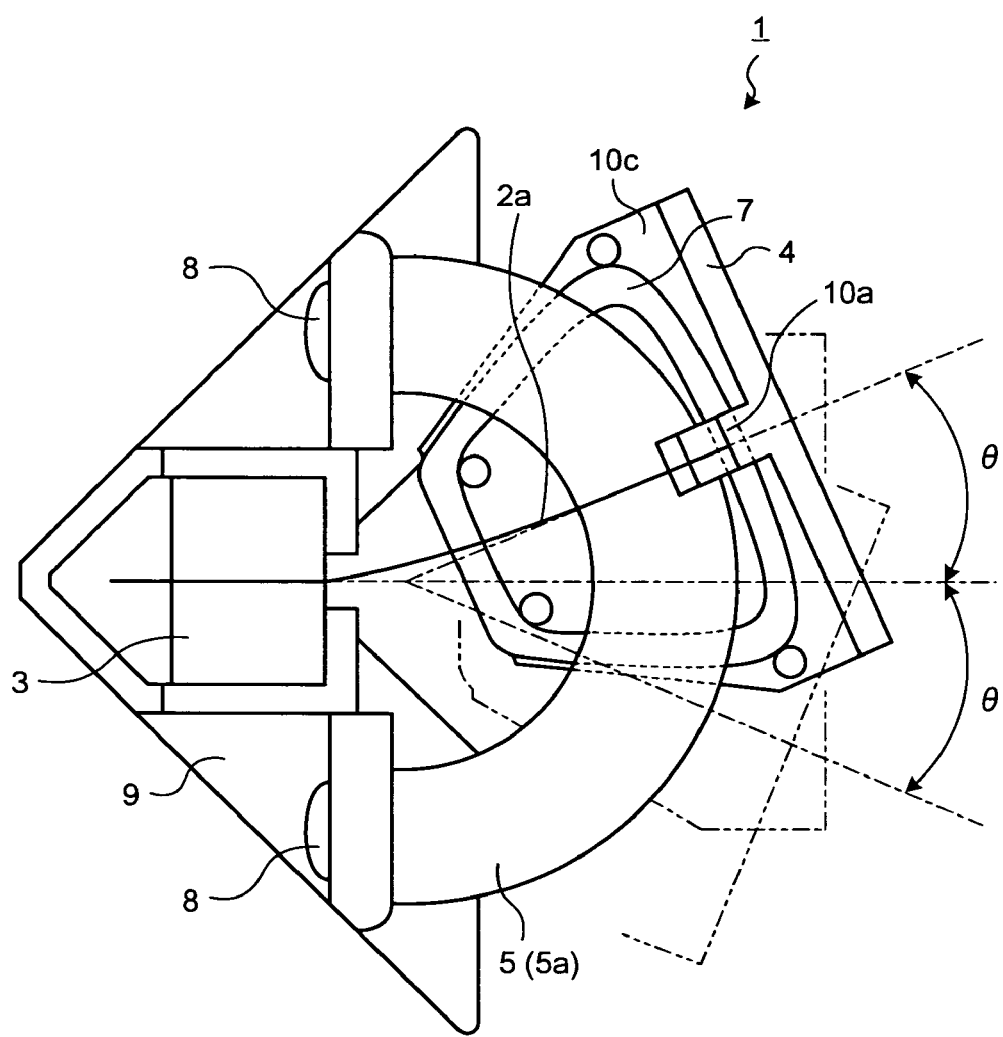
FIG. 4 is a diagram explaining an operation of the optical scanning actuator according to the embodiment of the present invention.

FIG. 4 is a diagram explaining an operation of the optical scanning actuator 1 and illustrating an outline of the swinging movement. In FIG. 4, a case in which the leaf spring 2a (2b) is most deflected and is at one returning position in the swinging movement is denoted by a solid line. As shown in FIG. 4, the mirror 4 and the frame member 10 swing by an angle θ equally in the upward direction and downward direction in FIG. 4 with respect to the origin position (horizontal direction in FIG. 4). When performing swinging, the mirror 4 moves in the neighborhood of outer edges of the arc-shaped portions 5a and 5b of the yoke 5 along the neighborhood of the outer edges. For example, when the maximum swinging angle θ of the mirror 4 from the origin position is θ=22.5(°), the mirror 4 swings in the range of 45° around the origin position as a center, and the scanning angle of light emitted from the mirror 4 becomes 90°.

Figure 6:
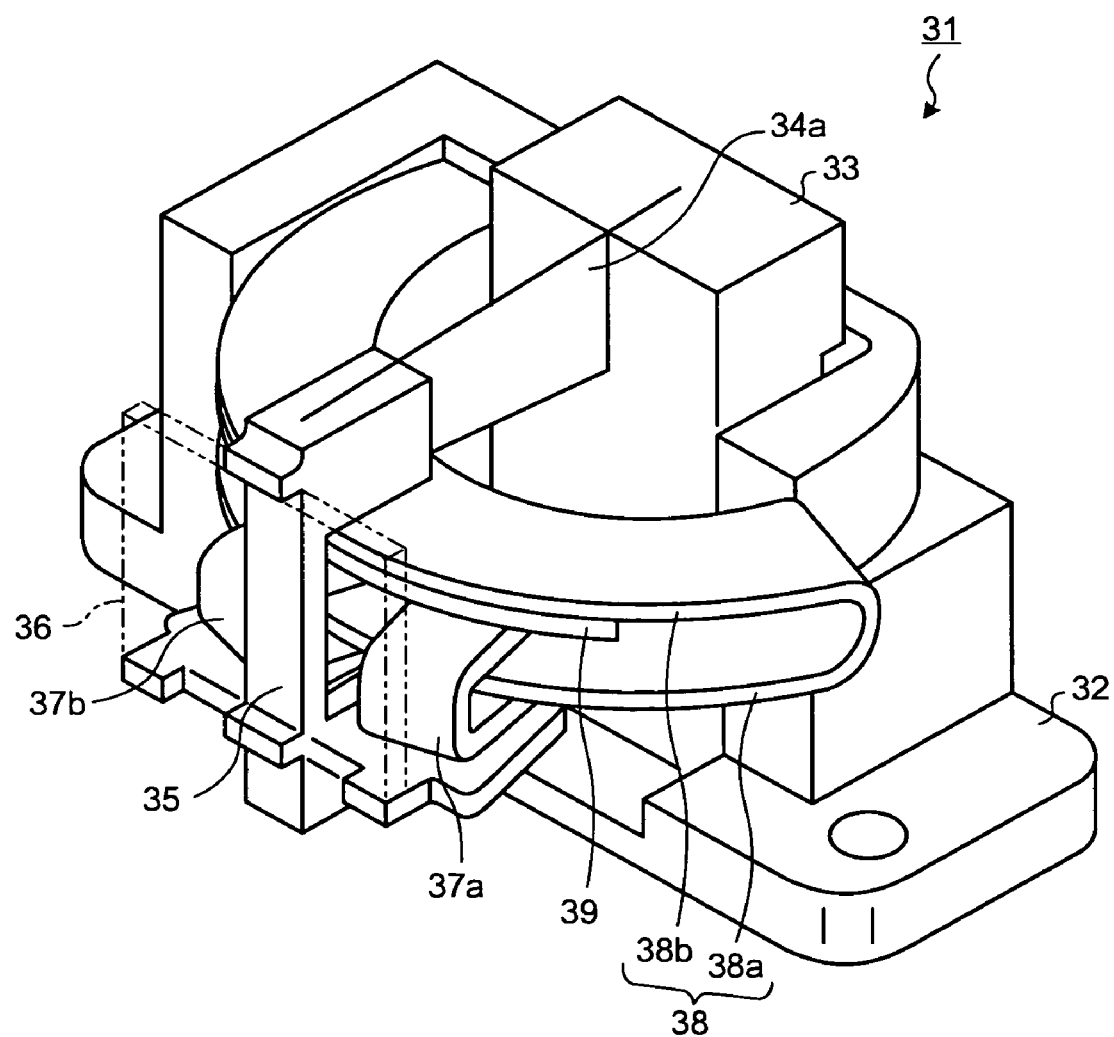
FIG. 6 is a diagram illustrating a configuration of a conventional optical scanning actuator.

In the optical scanning actuator 1 according to the present embodiment, the opening plane of the coil 7 is approximately parallel to the surfaces of the arc-shaped portions 5a and 5b of the yoke 5 and the magnet 6, and part of the yoke 5 does not pass through the opening plane of the coil 7. Therefore, in the optical scanning actuator 1, even when the frame member 10 is retracted in the direction of the fixing member 3 in a wide angle area in which the value of the swinging angle is large, the coil 7 does not come in contact with the yoke 5. Thus, the optical scanning actuator 1 can accurately perform scanning with light even in the wide angle area, which is different from a conventional optical scanning actuator 31 shown in FIG. 6, so that there is no fear that the coil 7 or the yoke 5 is damaged.

According to the present embodiment of the present invention explained above, the coil that constitutes part of the electromagnetic driving unit that drives the movable unit capable of moving together with the mirror (optical element) is positioned in the gap between the magnet and the yoke, which also constitute part of the electromagnetic driving unit, and the opening surface thereof is approximately orthogonal to the laminating direction of the magnet and the yoke, so that the coil does not come into contact with the yoke even when the movable unit is moved in a wide range, enabling to perform scanning with light accurately. Therefore, an optical scanning actuator that is capable of realizing widening of the scanning angle of light and is excellent in durability can be provided.

Moreover, according to the present embodiment, because the coil is only arranged in the gap between the magnet and the yoke, it is possible to have a large assembly tolerance for the coil, so that limitation on each shape of the yoke and the coil is low compared with the configuration in which the yoke passes through the coil, thereby increasing flexibility in designing. Consequently, a configuration can be simplified, so that an optical scanning actuator that is easy to assemble to be excellent in productivity and is suitable for size reduction can be provided.

Furthermore, according to the present embodiment, only one coil is used, so that a correcting unit for canceling the unbalance of the driving force need not be provided different from the case of using a plurality of coils, so that the mass of the movable unit can be reduced. Therefore, the mirror can be widely driven with a small driving force, enabling to realize power saving.

Figure 5:
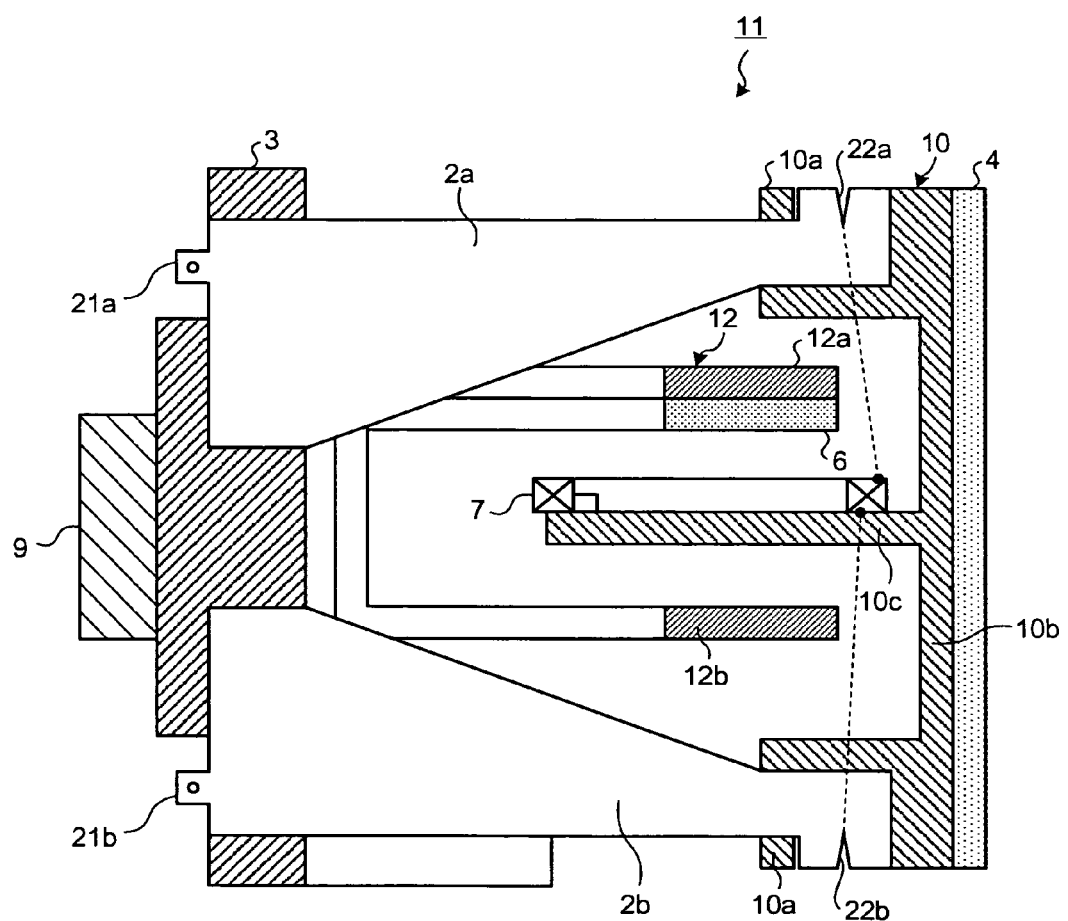
FIG. 5 is a perspective view illustrating a configuration of an optical scanning actuator according to a modified example of the embodiment of the present invention.

FIG. 5 is a diagram illustrating a configuration of an optical scanning actuator according to a modified example of the embodiment of the present invention. An optical scanning actuator 11 shown in FIG. 5 has the similar configuration to the above optical scanning actuator 1 except for the positional relationship between the yoke and the magnet. Therefore, in FIG. 5, the same components as those of the optical scanning actuator 1 will be given the same reference numerals.

A yoke 12 has approximately the same shape as the yoke 5 of the optical scanning actuator 1 and includes two arc-shaped portions 12a and 12b that are parallel to each other. In the modified example, the magnet 6 is fixed to the yoke 12 in a state of being laminated on the surface of the arc-shaped portion 12a positioned on the upper side out of the arc-shaped portions 12a and 12b, the surface opposing the arc-shaped portion 12b positioned on the lower side.

The optical scanning actuator 11 having the above configuration achieves the similar effect to the optical scanning actuator 1 according to the above embodiment.

The present invention is not limited to the above embodiment. For example, in the present invention, the shape of the leaf spring, the yoke, the magnet, and the coil is not limited to the above.

Moreover, in the present invention, a prism or a hologram element can be used, or a light emitting element such as a laser diode can be used, as the optical element instead of the mirror.

Furthermore, in the present invention, a configuration can be such that three or more leaf springs are used.

As described above, the present invention can include various embodiments and the like not described here, and various design changes and the like can be made in the range without departing from the technical idea as specified by the claims.

Industrial Applicability

As described above, the optical scanning actuator according to the present invention is useful for a scanning laser radar apparatus, a laser scanner, a laser printer, a laser marker, an object monitoring apparatus, and the like, and is particularly suitable for a scanning laser radar apparatus.

The invention claimed is:

1. An optical scanning actuator that performs scanning with light emitted from an optical element, the optical scanning actuator comprising:
a fixing member;
a movable unit that supports the optical element and is movable together with the optical element;
a plurality of leaf springs which have a thin plate shape and of which one end portion in a longitudinal direction is fixed to the fixing member and another end portion in the longitudinal direction is attached to the movable unit; and
an electromagnetic driving unit that includes a magnet that generates a magnetic flux, a yoke that is laminated in part on the magnet and forms a closed magnetic circuit together with the magnet, and a coil that is held by the movable unit, is positioned in a gap between the magnet and the yoke, includes an opening plane being substantially orthogonal to a laminating direction of the magnet and the yoke, and drives the movable unit by an electromagnetic force applied to the coil, wherein the yoke does not pass through the opening plane.

2. The optical scanning actuator according to claim 1, wherein the coil has a flat shape in which a height in a direction orthogonal to the opening plane is smaller than an arbitrary width in a direction parallel to the opening plane.

3. The optical scanning actuator according to claim 1 wherein
the yoke includes two arc-shaped portions having surfaces which are disposed in parallel so as to oppose to each other and have a same semi-circular ring shape with each other, and
the optical element is movable in a neighborhood of an outer edge of the arc-shaped portions along the outer edge.

4. The optical scanning actuator according to claim 3, wherein the magnet includes a surface that has a semi-circular ring shape substantially identical to the surfaces of the arc-shaped portions included in the yoke, and is laminated and fixed to a surface of one arc-shaped portion out of the two arc-shaped portions, the surface opposing another arc-shaped portion.

5. The optical scanning actuator according to claim 1, wherein
the leaf springs are arranged in parallel, and surfaces thereof that correspond to each other pass through a same plane and longitudinal directions thereof are substantially in parallel with each other in a state where each of the leaf springs is not deflected, and
the magnet, the yoke, and the coil are positioned between any adjacent two leaf springs out of the leaf springs.

6. The optical scanning actuator according to claim 1, wherein
the optical element is a mirror, and
a surface of the mirror is orthogonal to the longitudinal direction of the leaf springs in a state where the leaf springs are not deflected.

* * * * *